INVENTOR.
William R. Nesbitt
BY
Herbert Furman
ATTORNEY

United States Patent Office 3,334,854
Patented Aug. 8, 1967

3,334,854
SUNSHADE SUPPORT ASSEMBLY
William R. Nesbitt, Royal Oak, Mich., assignor to General Motors Corporation, Detroit, Mich., a corporation of Delaware
Filed May 12, 1966, Ser. No. 549,566
5 Claims. (Cl. 248—289)

This invention relates to sunshade support assemblies and more particularly to vehicle body sunshade support assemblies.

One feature of this invention is that it provides a sunshade support assembly which includes a friction brake member at least partially encircling a sunshade support rod and being tightened about the rod under a resilient biasing force to resist rotational movement of the rod about its axis from any adjusted position relative to the brake member. Another feature of this invention is that the assembly includes a pair of relatively movable members, each being operatively connected to said brake member, and resilient means biasing the members relative to each other in a direction to tighten the brake member about the rod. A further feature of this invention is that the movable members are located in telescopic relationship to each other, and the brake member locates the members relative to each other against the resilient means bias and thereby frictionally grip the support rod. Still another feature of this invention is that the resilient means also seats cooperating tapered portions on one member and a body mounted support means to rotatably mount the members and the support rod on the body for movement about an axis different than the rod axis.

These and other features of the invention will be readily apparent from the following specification and drawings wherein.

Figure 1:
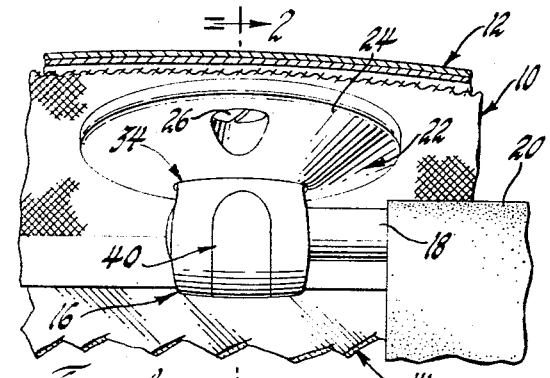
FIGURE 1 is a partial elevational view of a vehicle body embodying a sunshade support assembly according to this invention.
Figure 2:
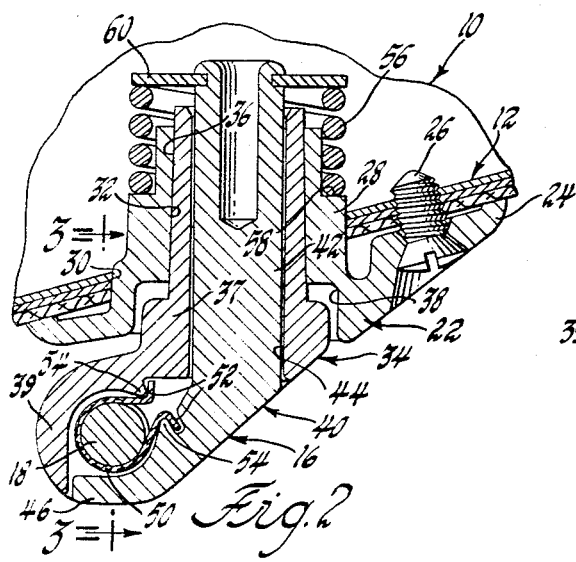
FIGURE 2 is an enlarged sectional view taken generally along the plane indicated by line 2—2 of FIGURE 1.
Figure 3:
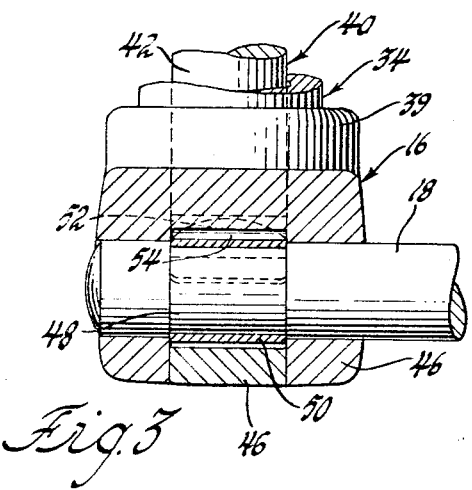
FIGURE 3 is a sectional view taken generally along the plane indicated by line 3—3 of FIGURE 2.
Figure 4:
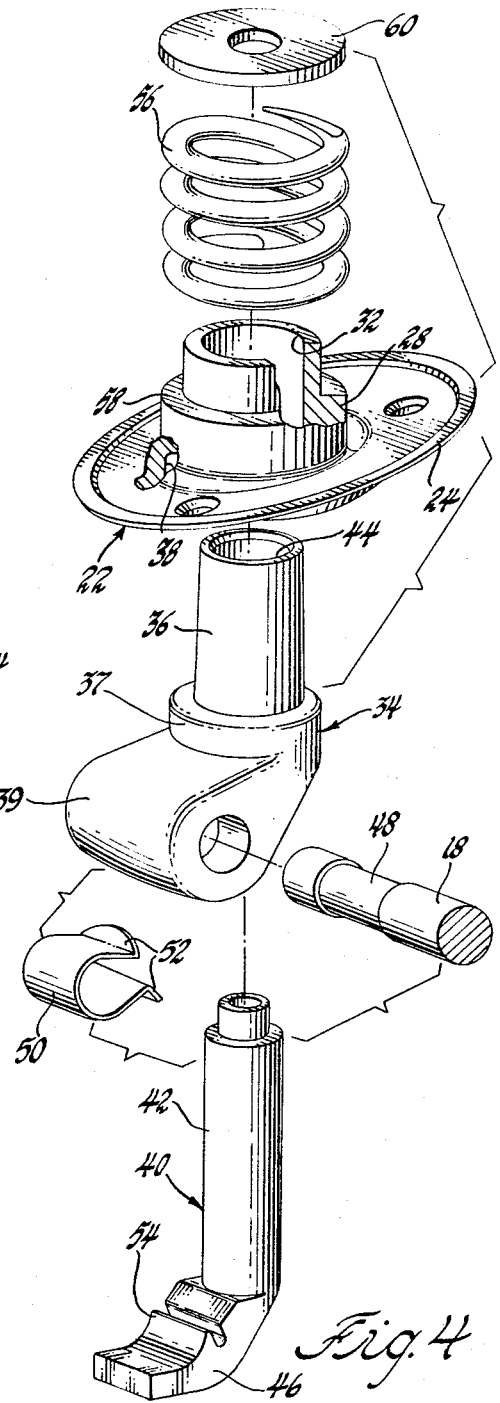
FIGURE 4 is an exploded perspective view.

Referring now particularly to FIGURE 1 of the drawings, a vehicle body designated generally 10 includes a body header structure 12 which houses the upper portion of the windshield 14. A sunshade support assembly 16 according to this invention is mounted on the header 12 and includes a support rod 18 which mounts a sunshade 20.

The assembly 16 includes a support or mounting member 22 having an annular flange 24 which is shaped to conform to the inner surface of the header structure. Member 22 is mounted on the header structure by a number of screws 26 extending htrough openings in the flange 24 into the header structure. The member 22 includes an annular body 28 which extends through an opening 30 in the header structure 12. The body 28 includes a downwardly divergent tapered annular bore or opening 32. An annular hollow rod support member 34 includes a downwardly divergent tapered outer surface 36 which seats within the opening 32 to rotatably mount the member 34 on the member 22 and axially locate the member 34 with respect thereto. The member 34 includes a flange 37 which is received within a recess 38 of the member 22 and has extending therefrom a generally arcuately shaped housing portion 39.

A second rod support member 40 includes an annular body 42 which is slidably received within an axial bore 44 of member 34. The member 40 includes a generally arcuately shaped housing portion 46 which is generally juxtaposed to the housing portion 39 to define a housing receiving an end portion of the support rod 18. The end portion of the support rod includes an annular groove 48 and a generally U-shaped friction brake member 50 of spring steel or similar material at least partially encircles the support rod within the groove 48. The free ends 52 of the member 50 are bent laterally to the body of the member and hooked over shoulders 54 of the members 34 and 40.

A coil compression spring 56 seats between an annular shoulder 58 of member 22 and a washer 60 staked to a reduced diameter hollow portion of the member 40. Spring 56 biases the member 40 upwardly or inwardly within the bore 44 to thereby bias the ends of the brake member 46 toward each other and tighten the brake member about the support rod 18 so that the brake member applies a frictional force to the support rod resisting rotational movement of the rod about its axis relative to the brake member. The spring 56 also seats the surface 36 within the bore 32 to axially locate the member 34 within the member 22 and rotatably mount the members 34 and 40 on the member 22.

The sunshade 20 and the rod 18 are movable as a unit relative to member 50 about an axis coincident with that of the rod 18 to adjustably locate the sunshade with respect to the windshield 14 about a generally horizontally disposed axis. The sunshade 20 and rod 18 are also movable as a unit with the members 34 and 40 about a generally vertically disposed axis coincident with that of the member 40. During such movement, the washer 60 will rotate with member 40 relative to the upper end of the spring 56. The biasing force of the spring seating the surface 36 within the bore 32 provides a frictional force resisting this movement and also serving to hold the members 34 and 40 in any adjusted position thereof relative to the member 22.

It will be noted that the spring 56 adjustably locates the sunshade 20 and the rod 18 in any horizontal or vertical adjusted position thereof relative to the body.

The seating of the brake member 50 within the groove 48 of the support rod provides a means for axially locating the support rod 18 with respect to the assembly 16.

The degree of frictional resistance between the brake member 50 and the support rod can be set by selecting a spring 56 of the desired spring force. It should also be noted that the spring 56 acts to take up manufacturing tolerances between the surface 36 and the bore 32 as well as between the brake member 50 and the groove 48 of the support rod 18 so that the sunshade 20 and the rod 18 are held in any adjusted position against any vibrations or other movement tending to displace the sunshade.

Thus this invention provides an improved sunshade support assembly.

I claim:
1. A sunshade support assembly comprising, in combination, a pair of relatively movable members, a sunshade support rod, a friction brake member at least partially encircling said rod, means operatively connecting said brake member to each of said members, and means biasing said members relative to each other in a direction to tighten said brake member about said rod.

2. The combination recited in claim 1 wherein said brake member includes a band having the ends thereof secured to a respective one of said members and being movable toward each other upon movement of said members in said direction.

3. The combination recited in claim 2 including support means adapted to be mounted on a vehicle body and having a tapered annular aperture therein, one of said members having an annular tapered portion slidably received within the tapered aperture of said support means to axially locate said one member relative to said support means and rotatably mount said one member thereon, said one member including a central bore and said other member being slidably received in said bore, said biasing means seating said tapered portion and biasing said other member inwardly of said bore to bias the ends of said band toward each other.

4. The combination recited in claim 1 wherein each of said members includes a housing portion, said portions being arranged in juxtaposed relationship to provide a housing for said brake member.

5. The combination recited in claim 1 wherein each of said members includes a shoulder and said friction brake member includes end portions hooked over a respective one of said shoulders.

References Cited

UNITED STATES PATENTS

| | | | |
|---|---|---|---|
| 1,190,502 | 7/1916 | Anderson | 248—296 X |
| 2,316,290 | 4/1943 | Schenbeck | 248—316.2 |
| 2,540,584 | 2/1951 | Jaycox | 248—42 |
| 3,182,329 | 5/1965 | Biesecker | 248—40 X |

ROY D. FRAZIER, *Primary Examiner.*

JOHN PETO, *Examiner.*